(12) United States Patent
Omori et al.

(10) Patent No.: US 8,231,312 B2
(45) Date of Patent: Jul. 31, 2012

(54) SURFACE-COATED CUTTING TOOL

(75) Inventors: Naoya Omori, Itami (JP); Yoshio Okada, Itami (JP); Minoru Itoh, Itami (JP); Shinya Imamura, Itami (JP); Susumu Okuno, Itami (JP); Hiroyuki Morimoto, Itami (JP); Chikako Kojima, Itami (JP)

(73) Assignee: Sumitomo Electric Hardmetal Corp., Itami-Shi (JP)

( * ) Notice: Subject to any disclaimer, the term of this patent is extended or adjusted under 35 U.S.C. 154(b) by 860 days.

(21) Appl. No.: 12/094,381

(22) PCT Filed: Aug. 8, 2007

(86) PCT No.: PCT/JP2007/065526
§ 371 (c)(1),
(2), (4) Date: May 20, 2008

(87) PCT Pub. No.: WO2008/026432
PCT Pub. Date: Mar. 6, 2008

(65) Prior Publication Data
US 2009/0162152 A1    Jun. 25, 2009

(30) Foreign Application Priority Data
Aug. 31, 2006 (JP) ................................. 2006-236447

(51) Int. Cl.
*B23B 27/14* (2006.01)
*B23B 51/00* (2006.01)
(52) U.S. Cl. ........................................ 407/119; 407/113
(58) Field of Classification Search .......... 407/113–116, 407/119; 428/335, 336, 216; 51/309, 307
See application file for complete search history.

(56) References Cited

U.S. PATENT DOCUMENTS 4,341,834 A * 7/1982 Kikuchi et al. ............... 428/216
5,597,272 A * 1/1997 Moriguchi et al. ........... 407/119
(Continued)

FOREIGN PATENT DOCUMENTS

DE    3124104 A1 *    1/1983
(Continued)

OTHER PUBLICATIONS

Israeli Office Action for corresponding IL Application No. 191449, dated May 15, 2011, pp. 1-4.
(Continued)

*Primary Examiner* — Boyer D Ashley
*Assistant Examiner* — Sara Addisu
(74) *Attorney, Agent, or Firm* — Ditthavong Mori & Steiner, P.C.

(57) ABSTRACT

A surface-coated cutting tool includes a coating layer (108) formed on a substrate (104), wherein assuming that the average thickness of the coating layer (108) on a first surface (106) and a second surface (107) of the substrate (104) is A, a difference between the maximum and minimum thicknesses of the coating layer (108) is larger than 0.04×A. Also, a surface-coated cutting tool includes a coating layer (108) formed on a substrate (104), wherein assuming that the average thickness of the coating layer (108) on a first surface (106) of the substrate (104) is B1, and the average thickness of the coating layer (108) on a second surface (107) of the substrate (104) is B2, a value obtained by dividing an absolute difference value between B1 and B2 by a larger value of B1 and B2 is larger than 0.04.

22 Claims, 4 Drawing Sheets

U.S. PATENT DOCUMENTS

| | | | |
|---|---|---|---|
| 5,776,588 A * | 7/1998 | Moriguchi et al. | 428/210 |
| 5,871,850 A * | 2/1999 | Moriguchi et al. | 428/651 |
| 6,015,614 A * | 1/2000 | Ruppi | 428/335 |
| 6,090,476 A * | 7/2000 | Thysell et al. | 428/216 |
| 6,093,479 A * | 7/2000 | Yoshimura et al. | 428/212 |
| 6,221,469 B1 * | 4/2001 | Ruppi | 428/216 |
| 6,251,508 B1 * | 6/2001 | Ruppi | 428/216 |
| 6,436,519 B2 * | 8/2002 | Holzschuh | 428/216 |
| 6,565,957 B2 * | 5/2003 | Nakamura et al. | 428/216 |
| 6,599,062 B1 * | 7/2003 | Oles et al. | 407/119 |
| 6,617,058 B2 * | 9/2003 | Schier | 428/698 |
| 6,689,450 B2 * | 2/2004 | Ruppi | 428/216 |
| 6,753,090 B2 * | 6/2004 | Haug et al. | 428/472 |
| 7,435,486 B2 * | 10/2008 | Dahlund et al. | 428/698 |
| 7,455,918 B2 * | 11/2008 | Gates et al. | 428/701 |
| 7,695,222 B2 * | 4/2010 | Omori et al. | 407/119 |
| 7,785,665 B2 * | 8/2010 | Gates et al. | 427/255.19 |
| 7,887,935 B2 * | 2/2011 | Elkouby et al. | 428/697 |
| 7,967,533 B2 * | 6/2011 | Omori et al. | 407/119 |
| 2002/0176755 A1 * | 11/2002 | Ruppi | 407/118 |
| 2005/0202283 A1 * | 9/2005 | Gates et al. | 428/698 |
| 2008/0240876 A1 * | 10/2008 | Elkouby et al. | 407/119 |
| 2009/0004440 A1 * | 1/2009 | Ban et al. | 428/192 |
| 2009/0004449 A1 * | 1/2009 | Ban et al. | 428/216 |
| 2009/0130434 A1 * | 5/2009 | Zhu et al. | 428/328 |
| 2009/0155559 A1 * | 6/2009 | Xu et al. | 428/216 |
| 2009/0269150 A1 | 10/2009 | Omori et al. | |
| 2010/0166512 A1 * | 7/2010 | Tanibuchi | 407/119 |

FOREIGN PATENT DOCUMENTS

| | | | |
|---|---|---|---|
| DE | 19602030 A1 * | 7/1997 | |
| JP | 57184616 A * | 11/1982 | |
| JP | 2004-50385 A | 2/2004 | |
| JP | 2004-195595 A | 7/2004 | |
| JP | 2004-216488 A | 8/2004 | |
| JP | 2005022071 A * | 1/2005 | |
| JP | 2006116660 A * | 5/2006 | |
| WO | WO PCT/JP2007/065526 | 10/2007 | |

OTHER PUBLICATIONS

Extended European Search Report for European Patent Application No. 07792194.8 dated Mar. 6, 2012, pp. 1-4.

* cited by examiner

SURFACE-COATED CUTTING TOOL

TECHNICAL FIELD

The present invention relates to a surface-coated cutting tool and particularly to a surface-coated cutting tool capable of complying with different cutting conditions by a single type.

BACKGROUND ART

As recent needs of the market of surface-coated cutting tools, it has been desired to develop a surface-coated cutting tool capable of complying with various cutting conditions by a single surface-coated cutting tool in order to decrease the cost of a surface-coated cutting tool.

A conventional surface-coated cutting tool has a constitution in which a coating layer with a uniform thickness is formed on a substrate.

[Patent Document 1] Japanese Unexamined Patent Application Publication No. 2004-195595

DISCLOSURE OF INVENTION

Problems to be Solved by the Invention

As the thickness of a coating layer increases, the wear resistance of a surface-coated cutting tool generally tends to increase, but defect resistance tends to decrease. While as the thickness of a coating layer decreases, the wear resistance of a surface-coated cutting tool generally tends to decrease, but defect resistance tends to increase.

Therefore, in a conventional surface-coated cutting tool, a coating layer has a uniform thickness, and thus it is necessary to use different types of surface-coated cutting tools under cutting conditions in which wear resistance is required and under cutting conditions in which defect resistance is required. Therefore, the cost of a surface-coated cutting tool cannot be sufficiently decreased.

In consideration of the above-mentioned situation, an object of the present invention is to provide a surface-coated cutting tool capable of complying with different cutting conditions by a single type.

Means for Solving the Invention

In accordance with a first embodiment of the present invention, the present invention can provide a surface-coated cutting tool including a coating layer formed on a substrate, wherein assuming that the average thickness of the coating layer on a first surface and a second surface of the substrate is A, a difference between the maximum and minimum thicknesses of the coating layer is larger than 0.04×A.

In accordance with a second embodiment of the present invention, the present invention can provide a surface-coated cutting tool including a coating layer formed on a substrate, wherein assuming that the average thickness of the coating layer on a first surface of the substrate is B1, and the average thickness of the coating layer on a second surface of the substrate is B2, a value obtained by dividing an absolute difference value between B1 and B2 by a larger value of B1 and B2 is larger than 0.04.

In accordance with the first and second embodiments of the present invention, the thickness of the coating layer is preferably the thickness at a cutting edge portion thereof.

In accordance with a third embodiment of the present invention, the present invention can provide a surface-coated cutting tool including a coating layer formed on a substrate, coating layer including a compound layer, wherein assuming that the average thickness of the compound layer on a first surface and a second surface of the substrate is C, a difference between the maximum and minimum thicknesses of the compound layer is larger than 0.04×C.

In accordance with a fourth embodiment of the present invention, the present invention can provide a surface-coated cutting tool including a coating layer formed on a substrate, the coating layer including a compound layer, wherein assuming that the average thickness of the compound layer on a first surface of the substrate is D1, and the average thickness of the compound layer on a second surface of the substrate is D2, a value obtained by dividing an absolute difference value between D1 and D2 by a larger value of D1 and D2 is larger than 0.04.

In accordance with the third and fourth embodiments of the present invention, the thickness of the compound layer is preferably the thickness at a cutting edge portion thereof.

In the surface-coated cutting tool of the present invention, the compound layer is preferably composed of or mainly composed of a compound of at least one element selected from the group consisting of titanium, zirconium, hafnium, vanadium, niobium, tantalum, chromium, molybdenum, tungsten, aluminum, and silicon, and at least one element selected from the group consisting of boron, carbon, nitrogen, and oxygen.

In the surface-coated cutting tool of the present invention, the compound layer is preferably composed of or mainly composed of a compound of at least one element selected from the group consisting of boron, carbon, nitrogen, and oxygen, and titanium.

In the surface-coated cutting tool of the present invention, the compound layer is preferably composed of or mainly composed of a titanium carbonitride formed by a MT-CVD (Medium Temperature Chemical Vapor Deposition) method.

In the surface-coated cutting tool of the present invention, each of the first and second surfaces of the substrate can be a surface having the largest or second largest area among the surfaces of the substrate. The surface-coated cutting tool of the present invention exhibits a significant effect on a negative tip in which each of the surfaces of a coating layer formed on a first surface and a second surface of a substrate serves as a rake face.

In the surface-coated cutting tool of the present invention, the substrate is preferably composed of at least one selected from the group consisting of a WC-based cemented carbide, cermet, high-speed steel, ceramic, a cubic boron nitride sintered compact, a diamond sintered compact, a silicon nitride sintered compact, aluminum oxide, and titanium carbide.

The surface-coated cutting tool is preferably used as a throw-away tip for drilling, end milling, milling, or turning, a metal saw, a gear cutting tool, a reamer, or a tapper.

ADVANTAGES

According to the present invention, a surface-coated cutting tool capable of complying with different cutting conditions by a single type can be provided.

REFERENCE NUMERALS 101 surface-coated cutting tool, 104 substrate, 105 side surface, 106 first surface, 107 second surface, 108 coating layer, 108a, 108b, 108c, 108d, 108e compound layer, 109 tray, 110 member, 11 bar-like member, 112 spacer, 113, 114, 115, 117 hypothetical line, 116 hypothetical tangent, 201, hypothetical rake face, 201a, 204a hypothetical rake parallel face, 202, hypothetical flank face, 202a, 205a hypothetical flank parallel face, 203, 206 hypothetical plane.

BEST MODE FOR CARRYING OUT THE INVENTION

The present invention will be described in further detail below. Hereinafter, description is made with reference to the drawings. In the drawings, the same reference numeral denote the same portion or corresponding portions. Each of the drawings is a schematic view for explanation, and the ratio of the thickness of a coating layer to the size of a body of a surface-coated cutting tool and the size ratio of the radius (R) of a corner may be different from actual values.

Figure 1:
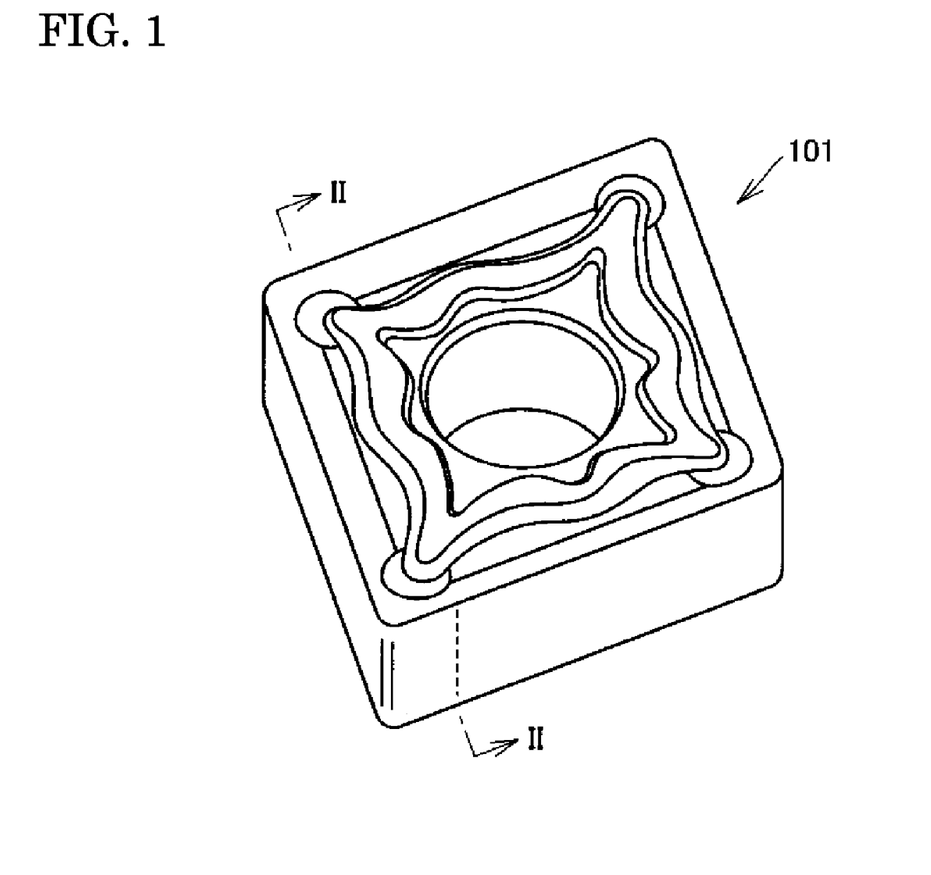
FIG. 1 is a schematic perspective view of a surface-coated cutting tool according to a preferred embodiment of the present invention.
Figure 2:
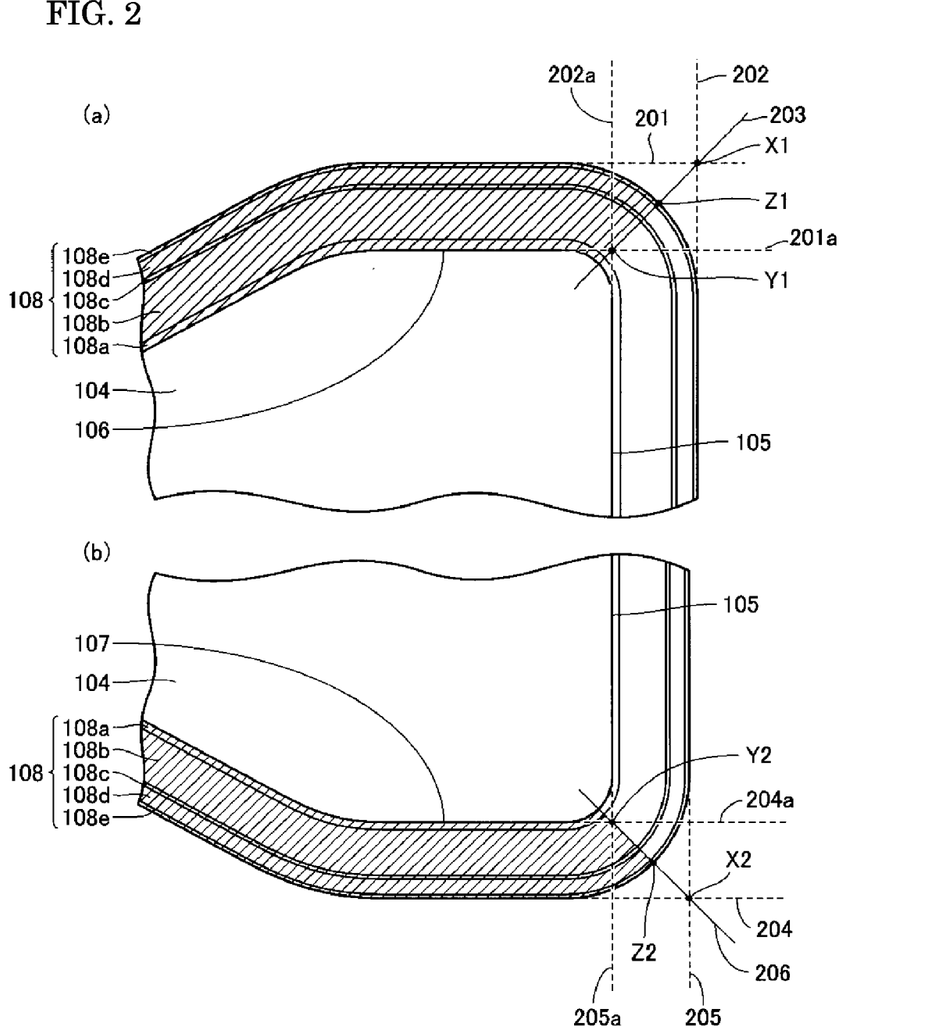
FIG. 2(a) is a schematic sectional view of an example of a section on the upper surface side of the surface-coated cutting tool shown in FIG. 1, taken along line II-II.
FIG. 2(b) is a schematic sectional view of an example of a section on the lower surface side of the surface-coated cutting tool shown in FIG. 1, taken along line II-II.

FIG. 1 is a schematic perspective view showing a surface-coated cutting tool according to a preferred embodiment of the present invention. FIG. 2(a) is a schematic sectional view of an example of a section on the upper surface side of the surface-coated cutting tool shown in FIG. 1, taken along line II-II; and FIG. 2(b) is a schematic sectional view of an example of a section on the lower surface side of the surface-coated cutting tool shown in FIG. 1, taken along line II-II.

As shown in FIGS. 2(a) and 2(b), a surface-coated cutting tool 101 of the present invention includes a coating layer 108 formed on a first surface 106 which is the top surface of a substrate 104, a second surface 107 which is the bottom surface of the substrate 104, and a side surface 105 of the substrate 104. The coating layer 108 includes compound layers 108a, 108b, 108c, 108d, and 108e which are formed in that order from the substrate 104 side.

A first embodiment of the present invention is characterized in that assuming that the average thickness of the coating layer 108 on the first surface 106 and the second surface 107 of the substrate 104 is A, a difference between the maximum and minimum thicknesses of the coating layer 108 on the first surface 106 and the second surface 107 of the substrate 104 is larger than 0.04×A.

This is based on the following inventor's finding as a result of intensive research on a surface-coated cutting tool capable of complying with different cutting conditions by a singly type: When the thickness of the coating layer 108 is set as in the first embodiment of the present invention, preferred cutting conditions for cutting with the thicker side of the coating layer 108 are different from those for cutting with the thinner side so that the same surface-coated cutting tool can preferably comply with different cutting conditions.

In accordance with a second embodiment of the present invention, assuming that the average thickness of the coating layer 108 on the first surface 106 of the substrate 104 is B1, and the average thickness of the coating layer 108 on the second surface 107 of the substrate 104 is B2, a value obtained by dividing an absolute difference value between B1 and B2 by a larger value of B1 and B2 is larger than 0.04.

This is based on the following inventor's finding as a result of intensive research on a surface-coated cutting tool capable of complying with different cutting conditions by a singly type: When the thickness of the coating layer 108 is set as in the second embodiment of the present invention, preferred cutting conditions for cutting with the thicker side of the coating layer 108 are different from those for cutting with the thinner side so that the same surface-coated cutting tool can preferably comply with different cutting conditions.

In accordance with the first and second embodiments of the present invention, the thickness of the coating layer 108 on the first surface 106 of the substrate 104 is the thickness of the coating layer 108 in at least a portion of a region (partially shown by oblique lines in FIG. 2(a)) of the first surface 106 inside the edge line Z1 of the surface-coated cutting tool 101 shown in FIG. 2(a).

Here, the edge line Z1 is a line of intersection between the outermost surface of the surface-coated cutting tool 101 and a hypothetical plane 203 including X1 and Y1 wherein X1 is a line of intersection between a hypothetical rake face 201 extended from the upper rake face (in contact with a workpiece to scoop the workpiece in cutting) and a hypothetical flank face 202 extended from a flank face (facing the workpiece after cutting with the rake face during cutting) of the surface-coated cutting tool 101, and Y1 is a line of intersection between a hypothetical rake parallel face 201a defined by moving the hypothetical rake face 201 until the hypothetical rake face 201 comes into contact with the first surface 106 of the substrate 104 and a hypothetical flank parallel face 202a defined by moving the hypothetical flank face 202 until the hypothetical flank face 202 comes into contact with the side surface 105 of the substrate 104.

In accordance with the first and second embodiments of the present invention, the thickness of the coating layer 108 on the second surface 107 of the substrate 104 is the thickness of the coating layer 108 in at least a portion of a region (partially shown by oblique lines in FIG. 2(b)) of the second surface 107 inside the edge line Z2 of the surface-coated cutting tool 101 shown in FIG. 2(b).

Here, the edge line Z2 is a line of intersection between the outermost surface of the surface-coated cutting tool 101 and a hypothetical plane 206 including X2 and Y2 wherein X2 is a line of intersection between a hypothetical rake face 204 extended from the lower rake face (in contact with a workpiece to scoop the workpiece in cutting) and a hypothetical flank face 205 extended from a flank face (facing the workpiece after cutting with the rake face during cutting) of the surface-coated cutting tool 101, and Y2 is a line of intersection between a hypothetical rake parallel face 204a defined by moving the hypothetical rake face 204 until the hypothetical rake face 204 comes into contact with the second surface 107 of the substrate 104 and a hypothetical flank parallel face 205a defined by moving the hypothetical flank face 202 until the hypothetical flank face 202 comes into contact with the side surface 105 of the substrate 104.

In accordance with the first and second embodiments of the present invention, the thickness of the coating layer in the cutting edge portion particularly preferably satisfies the relations of the first and second embodiments of the present invention. This is because since cutting with the surface-coated cutting tool 101 is performed by bringing the cutting edge portion of the surface-coated cutting tool 101 into contact with the workpiece, the same surface-coated cutting tool can preferably comply with different cutting conditions when the thickness of the coating layer in the cutting edge portion satisfies the relation of the first and second embodiments of the present invention.

On the top surface of the surface-coated cutting tool 101, a region of at least 2 mm from the edge line Z1 in a direction (the leftward direction in FIG. 2(a)) perpendicular to the edge line Z1 is used as the cutting edge portion. While on the bottom surface of the surface-coated cutting tool 101, a region of at least 2 mm from the edge line Z2 in a direction (the leftward direction in FIG. 2(b)) perpendicular to the edge line Z2 is used as the cutting edge portion.

Therefore, it is preferred that the thickness of the coating layer satisfies the relation of the first and/or second embodiment of the present invention in at least a portion of the region of at least 2 mm from the edge line Z1 in a direction (the leftward direction in FIG. 2(a)) perpendicular to the edge line Z1 on the top surface of the surface-coated cutting tool 101 and in at least a portion of the region of at least 2 mm from the edge line Z2 in a direction (the leftward direction in FIG. 2(b)) perpendicular to the edge line Z2 on the bottom surface of the surface-coated cutting tool 101.

In accordance with a third embodiment of the present invention, assuming that the average thickness of the compound layer on the first surface 106 and the second surface 107 of the substrate 104 is C, a difference between the maximum and minimum thicknesses of the compound layer is larger than $0.04 \times C$.

This is based on the following inventor's finding as a result of intensive research on the stabilization of a tool life: When the thickness of the compound layer is set as in the third embodiment of the present invention, preferred cutting conditions for cutting with the thicker side of the compound layer are different from those for cutting with the thinner side so that the same surface-coated cutting tool can preferably comply with different cutting conditions.

In accordance with a fourth embodiment of the present invention, assuming that the average thickness of the compound layer on the first surface 106 of the substrate 104 is D1, and the average thickness of the compound layer on the second surface 107 of the substrate 104 is D2, a value obtained by dividing an absolute difference value between D1 and D2 by a larger value of D1 and D2 is larger than 0.04.

This is based on the following inventor's finding as a result of intensive research on the stabilization of a tool life: When the thickness of the compound layer is set as in the fourth embodiment of the present invention, preferred cutting conditions for cutting with the thicker side of the compound layer are different from those for cutting with the thinner side so that the same surface-coated cutting tool can preferably comply with different cutting conditions.

In accordance with the third and fourth embodiments of the present invention, the thickness of the compound layer on the first surface 106 of the substrate 104 is the thickness of the compound layer in at least a portion of the region (partially shown by oblique lines in FIG. 2(a)) of the first surface 106 inside the edge line Z1 of the surface-coated cutting tool 101 shown in FIG. 2(a). The description of the edge line Z1 is the same as the above.

In accordance with the third and fourth embodiments of the present invention, the thickness of the compound layer on the second surface 107 of the substrate 104 is the thickness of the compound layer in at least a portion of the region (partially shown by oblique lines in FIG. 2(b)) of the second surface 107 inside the edge line Z2 of the surface-coated cutting tool 101 shown in FIG. 2(b). The description of the edge line Z1 is the same as the above.

In accordance with the third and fourth embodiments of the present invention, the thickness of the compound layer in the cutting edge portion particularly preferably satisfies the relations of the third and fourth embodiments of the present invention. This is because since cutting with the surface-coated cutting tool 101 is performed by bringing the cutting edge portion of the surface-coated cutting tool 101 into contact with the workpiece, when the thickness of the coating layer in the cutting edge portion satisfies the relations of the third and fourth embodiments of the present invention, preferred cutting conditions for cutting with the thicker side of the compound layer are different from those for cutting with the thinner side so that the same surface-coated cutting tool can preferably comply with different cutting conditions.

The description of the cutting edge portion is the same as the above. Therefore, it is preferred that the thickness of the compound layer satisfies the relation of the third and/or fourth embodiment of the present invention in at least a portion of the region of at least 2 mm from the edge line Z1 in a direction (the leftward direction in FIG. 2(a)) perpendicular to the edge line Z1 on the top surface of the surface-coated cutting tool 101 and in at least a portion of the region of at least 2 mm from the edge line Z2 in a direction (the leftward direction in FIG. 2(b)) perpendicular to the edge line Z2 on the bottom surface of the surface-coated cutting tool 101.

The third and fourth embodiments of the present invention are applied to only a coating layer including a plurality of compounds layer, and the first and/or second embodiment of the present invention is applied to a coating layer including a single compound layer.

In the third and fourth embodiments of the present invention, the thickness of any one of the compound layers or the total thickness (excluding the total thickness of the coating layer 108) of a plurality of any ones of the compound layers at the same position (e.g., in the surface-coating cutting tool 101 with the constitution shown in FIGS. 2(a) and 2(b), the compound layer 108a shown in FIGS. 2(a) and 2(b), the compound layer 108b shown in FIGS. 2(a) and 2(b), the compound layer 108c shown in FIGS. 2(a) and 2(b), the compound layer 108d shown in FIGS. 2(a) and 2(b), and the compound layer 108e shown in FIGS. 2(a) and 2(b)) may satisfy the relation of the third and/or fourth embodiment of the present invention.

The compound layer satisfying the relations according to the first to fourth embodiments of the present invention preferably includes at least one layer composed of or mainly composed of a compound of at least one element selected from the group consisting of titanium, zirconium, hafnium, vanadium, niobium, tantalum, chromium, molybdenum, tungsten, aluminum, and silicon, and at least one element selected from the group consisting of boron, carbon, nitrogen, and oxygen. In this case, the tool life of the surface-coated cutting tool of the present invention tends to be stabilized.

The compound layer satisfying the relations according to the first to fourth embodiments of the present invention preferably includes at least one layer composed of or mainly composed of a compound of at least one element selected from the group consisting of boron, carbon, nitrogen, and oxygen, and titanium. In this case, the tool life of the surface-coated cutting tool of the present invention tends to be stabilized.

The compound layer satisfying the relations according to the first to fourth embodiments of the present invention preferably includes at least one layer composed of or mainly composed of a titanium carbonitride formed by a MT-CVD method. When the layer composed of a titanium carbonitride formed by the MT-CVD method corresponds to the compound layer satisfying the relations according to the first to fourth embodiments of the present invention, the tool life of the surface-coated cutting tool of the present invention tends to be further stabilized. In the MT-CVD method, a layer composed of a titanium carbonitride can be formed by CVD using acetonitrile ($CH_3CN$) as a carbon source under the condition of a growth temperature (substrate temperature) of 700° C. to 1000° C.

In the present invention, the term "mainly composed" means that the compound layer is composed of the compound at a ratio of 50% by mass or more.

In the surface-coated cutting tool 101 of the present invention, the coating layer 108 can be formed by a conventional know method, for example, a CVD (Chemical Vapor Deposition) method or a PVD (Physical Vapor Deposition) method.

For example, when the coating layer 108 is formed by the CVD method, the substrate 104 is generally disposed on a tray and placed in an oven. However, the distance between the tray and the substrate 104 is changed so that the thickness of the coating layer 108 formed on the first surface 106 of the substrate 104 and the thickness of the coating layer 108 on the second surface 107 can be set to satisfy the relations of the first to fourth embodiments.

Figure 3:
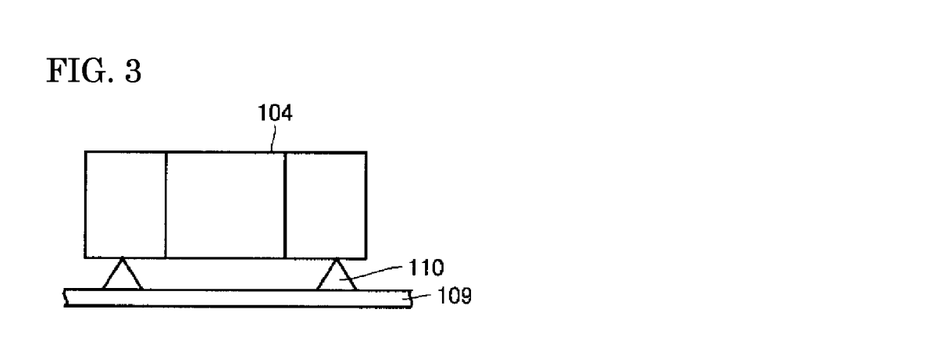
FIG. 3 is a schematic perspective view showing an example of a state in which a substrate is installed on a tray.

For example, as shown in a schematic sectional view of FIG. 3, triangular pyramid-shaped members 110 are placed between a tray 109 and the substrate 104, and the relations of the first to fourth embodiments can be satisfied by changing the height of the members 110.

For example, when the coating layer 108 is formed by the PVD method, a plurality of the substrates 104 is generally skewered with a rod-like member and placed in an oven. However, the distance between the skewered substrates 104 is changed so that the relations of the first to fourth embodiments can be satisfied.

Figure 4:
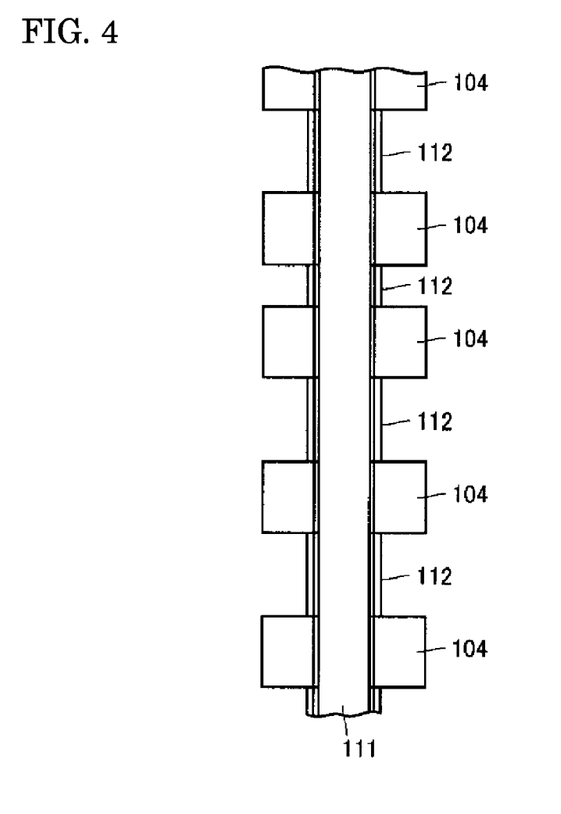
FIG. 4 is a schematic perspective view showing an example of a state in which substrate are skewered with a rod-like member.

For example, as shown in a schematic sectional view of FIG. 4, a plurality of the substrates 104 is skewered with a rod-like member 111, and spacers 112 are placed between the skewered substrates 104. The relations of the first to fourth embodiments can be satisfied by changing the height of the spacers 112.

Namely, in the present invention, the coating layer 108 can be formed by any one of various methods using either the CVD method or the PVD method.

As the substrate 104 of the surface-coated cutting tool 101 of the present invention, any substrate can be used as long as it is generally known as a substrate for such applications. For example, the substrate is preferably composed of a WC-based cemented carbide (containing tungsten carbide and cobalt or further containing a carbonitride of titanium, tantalum or niobium), cermet (containing titanium carbide, titanium nitride, or titanium carbonitride as a main component), high-speed steel, ceramic (titanium carbide, silicon carbide, silicon nitride, aluminum nitride, or aluminum oxide), a cubic boron nitride sintered compact, a diamond sintered compact, a silicon nitride sintered compact, or a mixture of aluminum oxide and titanium carbide.

Each of the first surface 106 and the second surface 107 of the substrate 104 is preferably a surface having the largest or second largest area among the surfaces of the substrate 104. In other words, when the first surface 106 is a surface having the largest area among the surfaces of the substrate 104, the second surface 107 is preferably a surface having the second largest area among the surfaces of the substrate 104. When the second surface 107 is a surface having the largest area among the surfaces of the substrate 104, the first surface 106 is preferably a surface having the second largest area among the surfaces of the substrate 104. When the first surface 106 and the second surface 107 of the substrate 104 have the same area, both the first surface 106 and the second surface 107 of the substrate 104 are preferably surfaces having the largest area among the surfaces of the substrate 104.

The surface-coated cutting tool 101 of the present invention is preferably a negative tip (at least one of the angles formed by a rake face and a flank face is 90° or more) in which each of the surface of the coating layer 108 formed on the first surface 106 and the surface of the coating layer 108 formed on the second surface 107 of the substrate 104 preferably serves as a rake face.

The surface-coated cutting tool 101 of the present invention is preferably used as a throw-away tip for drilling, end milling, milling, or turning, a metal saw, a gear cutting tool, a reamer, or a tapper.

EXAMPLES

Example 1

First, a mixed powder containing TaC powder, NbC powder, TiC powder, Co powder, and WC powder (mass of TaC powder: mass of NbC powder: mass of TiC powder: mass of Co powder: mass of WC powder=3:2:1.5:6:87.5) was sintered at a temperature of 1450° C. for 1 hour to form a plurality of sintered compacts. The β-free layer of each of the resultant sintered compacts had a thickness of 15 μm.

Next, each of the sintered compacts was subjected to edge processing and honing in a length of 0.06 mm from a rake face with a SiC brush to prepare a substrate having the same shape was CNMG120408N-UX manufactured by Sumitomo Electric Hardmetal Corp.

Then, triangular pyramid-shaped members with desired heights were placed on a flat surface of the same tray, and the substrates were placed on the triangular pyramid-shaped members. Each of the substrates was placed on a plurality of the triangular pyramid-shaped members having different heights so that the distance between each substrate and the tray varied.

Then, a TiN layer, a MT-TiCN layer, a TiBN layer, α-$Al_2O_3$ layer and a TiN layer were sequentially deposited on a surface of a substrate by a generally known CVD method to form a coating layer. As a result, a surface-coated cutting tool of Example 1 was prepared. The term "MT-TiCN layer" represents a TiCN layer formed by the MT-CVD method.

The surface-coated cutting tool of Example 1 was a negative tip in which each of the upper and lower surfaces having the largest area served as a rake face, and the other surface, i.e., the side surface, served as a flank face, and each of the angles formed by the rake faces and the flank face was 90°. The surface-coated cutting tool of Example 1 had cutting edges 1 and 2 having a vertex angle (an angle formed by two adjacent edge lines Z1) of 80° on the upper surface side and cutting edges 3 and 4 having a vertex angle (an angle formed by two adjacent edge lines Z2) of 80° on the lower surface side In the surface-coated cutting tool of Example 1, the thickness of each of the layers constituting the coating layer and the total thickness of the coating layer were measured. The results are shown in Table I. The unit of the thickness of each layer and the total thickness of the coating layer shown in Table I is μm.

Figure 5:
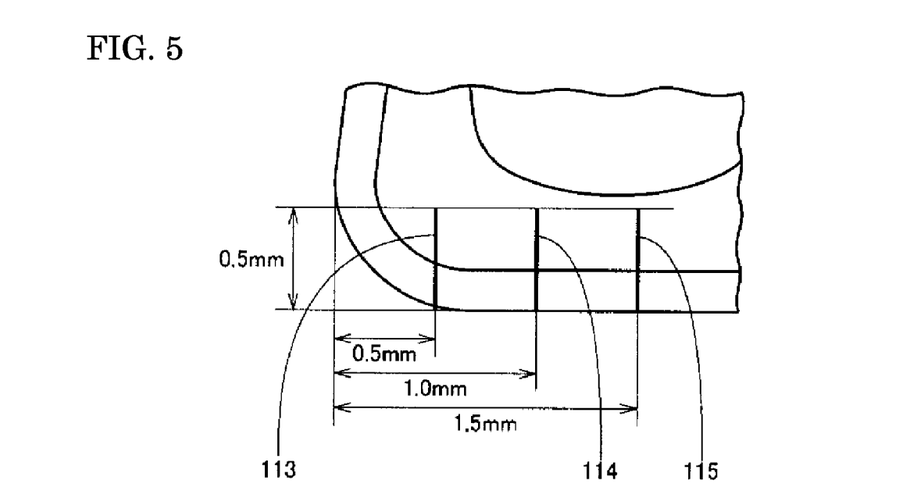
FIG. 5 is an enlarged schematic plan view showing measurement positions of the thickness of a coating layer or each of layers constituting the coating layer in Examples 1 to 6 and Comparative Examples 1 and 2.

The thickness of each of the layers shown in Table I is an average value calculated from the measured values measured as follows: As shown in an enlarged schematic plan view of FIG. 5, each of the sections taken along hypothetical lines 113, 114, and 115 each of which extended by 0.5 mm inward from each of the edge lines Z1 and Z2 in a direction perpendicular to the edge line and parallel to the rake face was lapped at ten positions on each of the hypothetical lines, and the thickness of each layer and the total thickness of the coating layer shown in Table I were measured by a metallographic microscope at a total of 30 points in each surface-coated cutting tool.

In Table I, each of A value, B value, C value, and D value is an average value calculated from the calculated A values, B values, C values, and D values calculated from the measured values of each surface-coated cutting tool of Example 1 according to the respective equations below. Each of the A value, B value, C value, and D value was a value rounded to three decimal places.

A value=(absolute difference value between maximum and minimum thicknesses of entire coating layer)/(average thickness of entire coating layer)

B value=(absolute difference value between average thicknesses of entire coating layer on upper surface side and lower surface side)/(larger average value of average thickness of entire coating layer on upper surface side and average thickness of entire coating layer on lower surface side)

C value=(absolute difference value between maximum and minimum thicknesses of MT-TiCN layer)/(average thickness of MT-TiCN layer)

D value=(absolute difference value between average thicknesses of MT-TiCN layer on upper surface side and lower surface side)/(larger average value of average thickness of Mt—TiCN layer on upper surface side and average thickness of MT-TiCN layer on lower surface side)

Further, a continuous cutting test and an intermittent cutting test were performed using each of the cutting edges 1 to 4 of each of the plurality of surface-coated cutting tools of Example 1 under the conditions below. The results are shown in Table II.

<Continuous Cutting Test Conditions>
Holder used: PCLNR2525-43 (manufactured by Sumitomo Electric Hardmetal Corp.)
Workpiece: SCM415 (HB=235), round rod of 250 mm in diameter
Cutting speed: 220 m/min
Feed: 0.3 mm/rev.
Depth of cut: 1.5 mm
Cutting time: 30 minutes
Cutting oil: water-soluble oil
Amount of wear: An average value of flank wear amount VB of each of the cutting edges on the upper surface side and the cutting edges on the lower surface side was calculated from values measured in a test of ten cutting edges on each of the upper and lower surface sides.

<Intermittent Cutting Test Conditions>
Holder used: PCLNR2525-43 (manufactured by Sumitomo Electric Hardmetal Corp.)
Workpiece: SCM415 (HB=250), round rod of 250 mm in diameter having four grooves
Cutting speed: 145 m/min
Feed: 0.45 mm/rev.
Depth of cut: 2 mm
Cutting time: 30 seconds
Cutting oil: No
Defective rate: A test was carried out using 20 cutting edges on each of the upper and lower surface sides to calculate a rate of defects (defective rate: %) of the cutting edges on each of the upper and the lower surface side.

Table II indicates that each of the surface-coated cutting tools of Example 1 shows large differences in the amount of flank wear VB (mm) and the defective rate (%) between the cutting edges on the upper and lower surface sides. Therefore, the preferred cutting conditions for cutting with the cutting edge on the upper surface side are greatly different from those for cutting with the cutting edge on the lower surface side. It was thus confirmed that the same surface-coated cutting tool can preferably comply with various cutting conditions.

Example 2

A plurality of surface-coated cutting tools of Example 2 was formed by the same method under the same conditions as in Example 1 except that a coating layer was formed using triangular pyramid members each having a height different from that in Example 1.

Each of the surface-coated cutting tools of Example 2 was a negative tip in which each of the upper and lower surfaces having the largest area served as a rake face, and the other surface, i.e., the side surface, served as a flank face, and each of the angles formed by the rake faces and the flank face was 90°. Each of the surface-coated cutting tools of Example 2 had cutting edges 1 and 2 having a vertex angle of 80° on the upper surface side and cutting edges 3 and 4 having a vertex angle of 80° on the lower surface side In each of the surface-coated cutting tools of Example 2, the thickness of each of the layers constituting the coating layer and the total thickness of the coating layer were measured by the same method as in Example 1. The results are shown in Table I.

A continuous cutting test and an intermittent cutting test were carried out by the same methods under the same conditions as in Example 1 using the plurality of surface-coated cutting tools of Example 2. The results are shown in Table II.

Table II indicates that each of the surface-coated cutting tools of Example 2 shows large differences in the amount of flank wear VB (mm) and the defective rate (%) between the cutting edges on the upper and lower surface sides. Therefore, the preferred cutting conditions for cutting with the cutting edge on the upper surface side are greatly different from those for cutting with the cutting edge on the lower surface side. It was thus confirmed that the same surface-coated cutting tool can preferably comply with various cutting conditions.

Example 3

A plurality of surface-coated cutting tools of Example 3 was formed by the same method under the same conditions as in Example 1 except that a coating layer was formed using triangular pyramid members each having a height different from that in Example 1.

Each of the surface-coated cutting tools of Example 3 was a negative tip in which each of the upper and lower surfaces having the largest area served as a rake face, and the other surface, i.e., the side surface, served as a flank face, and each of the angles formed by the rake faces and the flank face was 90°. Each of the surface-coated cutting tools of Example 2 had cutting edges 1 and 2 having a vertex angle of 80° on the upper surface side and cutting edges 3 and 4 having a vertex angle of 80° on the lower surface side In each of the surface-coated cutting tools of Example 3, the thickness of each of the layers constituting the coating layer and the total thickness of the coating layer were measured by the same method as in Example 1. The results are shown in Table I.

A continuous cutting test and an intermittent cutting test were carried out by the same methods under the same conditions as in Example 1 using the plurality of surface-coated cutting tools of Example 3. The results are shown in Table II.

Table II indicates that each of the surface-coated cutting tools of Example 3 shows large differences in the amount of flank wear VB (mm) and the defective rate (%) between the cutting edges on the upper and lower surface sides. Therefore, the preferred cutting conditions for cutting with the cutting edge on the upper surface side are greatly different from those for cutting with the cutting edge on the lower surface side. It was thus confirmed that the same surface-coated cutting tool can preferably comply with various cutting conditions.

Comparative Example 1

A plurality of surface-coated cutting tools of Comparative Example 1 was formed by the same method under the same conditions as in Example 3 except that a coating layer was formed by the CVD method using triangular pyramid members having the same height for the upper and lower surface sides.

In each of the surface-coated cutting tools of Comparative Example 1, the thickness of each of the layers constituting the coating layer and the total thickness of the coating layer were measured by the same method as in Example 1. The results are shown in Table I.

A continuous cutting test and an intermittent cutting test were carried out by the same methods under the same conditions as in Example 1 using the plurality of surface-coated cutting tools of comparative Example 1. The results are shown in Table II.

Table II indicates that each of the surface-coated cutting tools of Comparative Example 1 shows the same value of each of the amount of flank wear VB (mm) and the defective rate (%) for the cutting edges on the upper and lower surface sides. It was thus confirmed that the surface-coated cutting tool of Comparative Example 1 can comply with only the same cutting conditions even by using any one of the cutting edges.

TABLE I

| | | Thickness of each layer constituting coating layer (μm) | | | | | | | | | |
|---|---|---|---|---|---|---|---|---|---|---|---|
| | | TiN layer | MT-TiCN layer | TiBN layer | α-Al$_2$O$_3$ layer | TiN layer | Total | A value | B value | C value | D value |
| Example 1 | Upper cutting edge 1 | 0.91 | 7.18 | 0.31 | 3.41 | 0.58 | 12.39 | 0.045 | 0.041 | 0.071 | 0.066 |
| | Upper cutting edge 2 | 0.90 | 7.16 | 0.30 | 3.42 | 0.57 | 12.35 | | | | |
| | Lower cutting edge 3 | 0.90 | 6.70 | 0.31 | 3.37 | 0.57 | 11.85 | | | | |
| | Lower cutting edge 4 | 0.91 | 6.69 | 0.32 | 3.38 | 0.58 | 11.88 | | | | |
| Example 2 | Upper cutting edge 1 | 0.91 | 7.16 | 0.31 | 3.41 | 0.58 | 12.37 | 0.105 | 0.099 | 0.158 | 0.146 |
| | Upper cutting edge 2 | 0.91 | 7.17 | 0.32 | 3.40 | 0.58 | 12.38 | | | | |
| | Lower cutting edge 3 | 0.89 | 6.12 | 0.31 | 3.29 | 0.55 | 11.16 | | | | |
| | Lower cutting edge 4 | 0.88 | 6.12 | 0.31 | 3.29 | 0.54 | 11.14 | | | | |
| Example 3 | Upper cutting edge 1 | 0.91 | 7.16 | 0.31 | 3.41 | 0.58 | 12.37 | 0.225 | 0.201 | 0.371 | 0.312 |
| | Upper cutting edge 2 | 0.92 | 7.15 | 0.31 | 3.41 | 0.59 | 12.38 | | | | |
| | Lower cutting edge 3 | 0.90 | 4.92 | 0.30 | 3.22 | 0.53 | 9.87 | | | | |
| | Lower cutting edge 4 | 0.90 | 4.93 | 0.31 | 3.23 | 0.54 | 9.91 | | | | |
| Comparative Example 1 | Upper cutting edge 1 | 0.91 | 7.16 | 0.31 | 3.41 | 0.58 | 12.37 | 0.007 | 0.003 | 0.008 | 0.003 |
| | Upper cutting edge 2 | 0.92 | 7.11 | 0.32 | 3.40 | 0.57 | 12.32 | | | | |
| | Lower cutting edge 3 | 0.91 | 7.13 | 0.31 | 3.41 | 0.57 | 12.33 | | | | |
| | Lower cutting edge 4 | 0.91 | 7.10 | 0.32 | 3.39 | 0.56 | 12.28 | | | | |

TABLE II

| | | Amount of flank wear VB (mm) | Defective rate (%) |
|---|---|---|---|
| Example 1 | Upper surface | 0.121 | 80 |
| | Lower surface | 0.123 | 40 |
| Example 2 | Upper surface | 0.121 | 80 |
| | Lower surface | 0.125 | 30 |
| Example 3 | Upper surface | 0.121 | 80 |
| | Lower surface | 0.126 | 25 |
| Comparative Example 1 | Upper surface | 0.121 | 80 |
| | Lower surface | 0.121 | 80 |

As seen from the results shown in Tables I and II, it was confirmed that the surface-coated cutting tools of Examples 1 to 3 in each of which each of the values A, B, C, and D is larger than 0.04 show large differences in the amount of flank wear VB (mm) and the defective rate (%) between the cutting edges on the upper and lower surface sides, as compared with the surface-coated cutting tool of Comparative Example 1 in which each of the values A, B, C, and D is smaller than 0.04. Therefore, it was confirmed that the same surface-coated cutting tool of each of Examples 1 to 3 can preferably comply with various cutting conditions as compared with the surface-coated cutting tool of Comparative Example 1.

Example 4

First, a mixed powder containing TaC powder, $Cr_3C_2$ powder, Co powder, and WC powder (mass of TaC powder: mass of $Cr_3C_2$ powder: mass of Co powder: mass of WC powder=0.3:0.4:8:91.3) was sintered at a temperature of 1440° C. for 1 hour to form a plurality of sintered compacts. A β-free layer was not formed in each of the resultant sintered compacts.

Next, each of the sintered compacts was subjected to edge processing and honing in a length of 0.03 mm from a rake face with a SiC brush to prepare a substrate having the same shape was CNMG120408N-EX manufactured by Sumitomo Electric Hardmetal Corp.

Then, the substrates were arranged with spacers provided therebetween and skewered with a rod-like member. Then, a TiAlN layer was deposited on the surface of each of the substrates by a conventional know PVD method to form surface-coated cutting tools of Example 4.

Each of the surface-coated cutting tools of Example 4 was a negative tip in which each of the upper and lower surfaces having the largest area served as a rake face, and the other surface, i.e., the side surface, served as a flank face, and each of the angles formed by the rake faces and the flank face was 90°. Each of the surface-coated cutting tools of Example 4 had cutting edges 1 and 2 having a vertex angle of 80° on the upper surface side and cutting edges 3 and 4 having a vertex angle of 80° on the lower surface side In each of the surface-coated cutting tools of Example 4, the thickness of the coating layer including the TiAlN layer was measured by the same method as in Example 1. The results are shown in Table III. In Table III, the thickness of the TiAlN layer and the A and B values are described according to the notations of Example 1.

Further, a continuous cutting test and an intermittent cutting test were performed using each of the surface-coated cutting tools of Example 4 under the conditions below. The results are shown in Table IV.

<Continuous Cutting Test Conditions>
  Holder used: PCLNR2525-43 (manufactured by Sumitomo Electric Hardmetal Corp.)
  Workpiece: INCONEL718, round rod of 200 mm in diameter
  Cutting speed: 35 m/min
  Feed: 0.16 mm/rev.
  Depth of cut: 1.5 mm
  Cutting time: 4 minutes
  Cutting oil: water-soluble oil
  Amount of wear: An average value of flank wear amount VB of each of the cutting edges on the upper surface side and the cutting edges on the lower surface side was calculated from values measured in a test of ten cutting edges on each of the upper and lower surface sides.

<Intermittent Cutting Test Conditions>
  Holder used: PCLNR2525-43 (manufactured by Sumitomo Electric Hardmetal Corp.)
  Workpiece: INCONEL718, round rod of 200 mm in diameter having four grooves
  Cutting speed: 35 m/min
  Feed: 0.2 mm/rev.
  Depth of cut: 2 mm
  Cutting time: 10 seconds
  Cutting oil: water-soluble oil
  Defective rate: A test was carried out using 20 cutting edges on each of the upper and lower surface sides to calculate a rate of defects (defective rate: %) of the cutting edges on each of the upper and the lower surface side.

Table IV shows that each of the surface-coated cutting tools of Example 4 shows large differences in the amount of flank wear VB (mm) and the defective rate (%) between the cutting edges on the upper and lower surface sides. Therefore, the preferred cutting conditions for cutting with the cutting edge on the upper surface side are greatly different from those for cutting with the cutting edge on the lower surface side. It was thus confirmed that the same surface-coated cutting tool can preferably comply with various cutting conditions.

Example 5

A plurality of surface-coated cutting tools of Example 5 was formed by the same method under the same conditions as in Example 4 except that the substrates which were spaced with a distance difference from that in Example 4 were skewered with a rod-like member in order to form a coating layer by the PVD method.

Each of the surface-coated cutting tools of Example 5 was a negative tip in which each of the upper and lower surfaces having the largest area served as a rake face, and the other surface, i.e., the side surface, served as a flank face, and each of the angles formed by the rake faces and the flank face was 90°. Each of the surface-coated cutting tools of Example 5 had cutting edges 1 and 2 having a vertex angle of 80° on the upper surface side and cutting edges 3 and 4 having a vertex angle of 80° on the lower surface side In each of the surface-coated cutting tools of Example 5, the thickness of the TiAlN layer was measured by the same method as in Example 4. The results are shown in Table III.

A continuous cutting test and an intermittent cutting test were carried out by the same methods under the same conditions as in Example 4 using the plurality of surface-coated cutting tools of Example 5. The results are shown in Table IV.

Table IV indicates that each of the surface-coated cutting tools of Example 5 shows large differences in the amount of flank wear VB (mm) and the defective rate (%) between the cutting edges on the upper and lower surface sides. Therefore, the preferred cutting conditions for cutting with the cutting edge on the upper surface side are greatly different from those for cutting with the cutting edge on the lower surface side. It was thus confirmed that the same surface-coated cutting tool can preferably comply with various cutting conditions.

Example 6

A plurality of surface-coated cutting tools of Example 6 was formed by the same method under the same conditions as in Example 4 except that the substrates which were spaced with a distance difference from that in Example 4 were skewered with a rod-like member in order to form a coating layer by the PVD method.

Each of the surface-coated cutting tools of Example 6 was a negative tip in which each of the upper and lower surfaces having the largest area served as a rake face, and the other surface, i.e., the side surface, served as a flank face, and each of the angles formed by the rake faces and the flank face was 90°. Each of the surface-coated cutting tools of Example 6 had cutting edges 1 and 2 having a vertex angle of 80° on the upper surface side and cutting edges 3 and 4 having a vertex angle of 80° on the lower surface side In each of the surface-coated cutting tools of Example 6, the thickness of the TiAlN layer was measured by the same method as in Example 4. The results are shown in Table III.

A continuous cutting test and an intermittent cutting test were carried out by the same methods under the same conditions as in Example 4 using the plurality of surface-coated cutting tools of Example 6. The results are shown in Table IV.

Table IV indicates that each of the surface-coated cutting tools of Example 6 shows large differences in the amount of flank wear VB (mm) and the defective rate (%) between the cutting edges on the upper and lower surface sides. Therefore, the preferred cutting conditions for cutting with the cutting edge on the upper surface side are greatly different from those for cutting with the cutting edge on the lower surface side. It was thus confirmed that the same surface-coated cutting tool can preferably comply with various cutting conditions.

Comparative Example 2

A plurality of surface-coated cutting tools of Comparative Example 2 was formed by the same method under the same conditions as in Example 4 except that the substrates which were spaced with the same distance therebetween were skewered with a bar-like member in order to form a coating layer by the PVD method.

In each of the surface-coated cutting tools of Comparative Example 2, the thickness of the TiAlN layer was measured by the same method as in Example 4. The results are shown in Table III.

A continuous cutting test and an intermittent cutting test were carried out by the same methods under the same conditions as in Example 4 using the plurality of surface-coated cutting tools of Comparative Example 2. The results are shown in Table IV.

Table IV indicates that each of the surface-coated cutting tools of Comparative Example 2 shows the same value of each of the amount of flank wear VB (mm) and the defective rate (%) for the cutting edges on the upper and lower surface sides. It was thus confirmed that the surface-coated cutting tool of Comparative Example 2 can comply with only the same cutting conditions even by using any one of the cutting edges.

TABLE III

|  |  | Thickness of TiAlN layer (μm) | A value | B value |
|---|---|---|---|---|
| Example 4 | Upper cutting edge 1 | 4.82 | 0.045 | 0.043 |
|  | Upper cutting edge 2 | 4.81 |  |  |
|  | Lower cutting edge 3 | 4.61 |  |  |
|  | Lower cutting edge 4 | 4.61 |  |  |
| Example 5 | Upper cutting edge 1 | 4.82 | 0.114 | 0.107 |
|  | Upper cutting edge 2 | 4.83 |  |  |
|  | Lower cutting edge 3 | 4.31 |  |  |
|  | Lower cutting edge 4 | 4.31 |  |  |
| Example 6 | Upper cutting edge 1 | 4.82 | 0.159 | 0.146 |
|  | Upper cutting edge 2 | 4.82 |  |  |
|  | Lower cutting edge 3 | 4.11 |  |  |
|  | Lower cutting edge 4 | 4.12 |  |  |
| Comparative | Upper cutting edge 1 | 4.82 | 0.004 | 0.002 |
| Example 2 | Upper cutting edge 2 | 4.83 |  |  |
|  | Lower cutting edge 3 | 4.82 |  |  |
|  | Lower cutting edge 4 | 4.81 |  |  |

TABLE IV

|  |  | Amount of flank wear VB (mm) | Defective rate (%) |
|---|---|---|---|
| Example 4 | Upper surface | 0.103 | 70 |
|  | Lower surface | 0.104 | 45 |
| Example 5 | Upper surface | 0.103 | 70 |
|  | Lower surface | 0.106 | 35 |
| Example 6 | Upper surface | 0.103 | 70 |
|  | Lower surface | 0.108 | 25 |
| Comparative | Upper surface | 0.103 | 70 |
| Example 2 | Lower surface | 0.103 | 70 |

As seen from the results shown in Tables III and IV, it was confirmed that the surface-coated cutting tools of Examples 4 to 6 in each of which each of the values A, B, C, and D is larger than 0.04 show large differences in the amount of flank wear VB (mm) and the defective rate (%) between the cutting edges on the upper and lower surface sides, as compared with the surface-coated cutting tool of Comparative Example 2 in which each of the values A, B, C, and D is smaller than 0.04. Therefore, it was confirmed that the same surface-coated cutting tool of each of Examples 4 to 6 can preferably comply with various cutting conditions as compared with the surface-coated cutting tool of Comparative Example 2.

Example 7

First, a mixed powder containing TiC powder, TaC powder, NbC powder, Co powder, and WC powder (mass of TiC powder: mass of TaC powder: mass of NbC powder: mass of Co powder: mass of WC powder=0.2:0.4:0.2:5.7:93.5) was sintered at a temperature of 1450° C. for 1 hour to form a plurality of sintered compacts. A β-free layer was not formed in each of the resultant sintered compacts.

Next, each of the sintered compacts was subjected to edge processing and honing in a length of 0.03 mm from a rake face with a SiC brush to prepare a substrate (without a chip breaker) having the same shape as CNMA120408 specified in JIS B 4120-1998.

Then, triangular pyramid-shaped members with desired heights were placed on a flat surface of the same tray, and the substrates were placed on the triangular pyramid-shaped members. The height of the triangular pyramid-shaped members used for forming a coating layer on the upper surface side was different from that for forming a coating layer on the lower surface side.

Then, a TiN layer, a MT-TiCN layer, a TiBN layer, a α-$Al_2O_3$ layer and a TiN layer were sequentially deposited on a surface of a substrate by a generally known CVD method to form a coating layer. As a result, surface-coated cutting tools of Example 7 were prepared. The term "MT-TiCN layer" represents a TiCN layer formed by the MT-CVD method.

Each of the surface-coated cutting tools of Example 7 was a negative tip in which each of the upper and lower surfaces having the largest area served as a rake face, and the other surface, i.e., the side surface, served as a flank face, and each of the angles formed by the rake faces and the flank face was 90°. Each of the surface-coated cutting tool 101 of Example 7 had cutting edges 1 and 2 having a vertex angle (an angle formed by two adjacent edge lines Z1) of 80° on the upper surface side and cutting edges 3 and 4 having a vertex angle (an angle formed by two adjacent edge lines Z2) of 80° on the lower surface side In each of the surface-coated cutting tools of Example 7, the thickness of each of the layers constituting the coating layer and the total thickness of the coating layer were measured. The results are shown in Table V. The unit of the thickness of each layer and the total thickness of the coating layer shown in Table V is μm.

Figure 6:
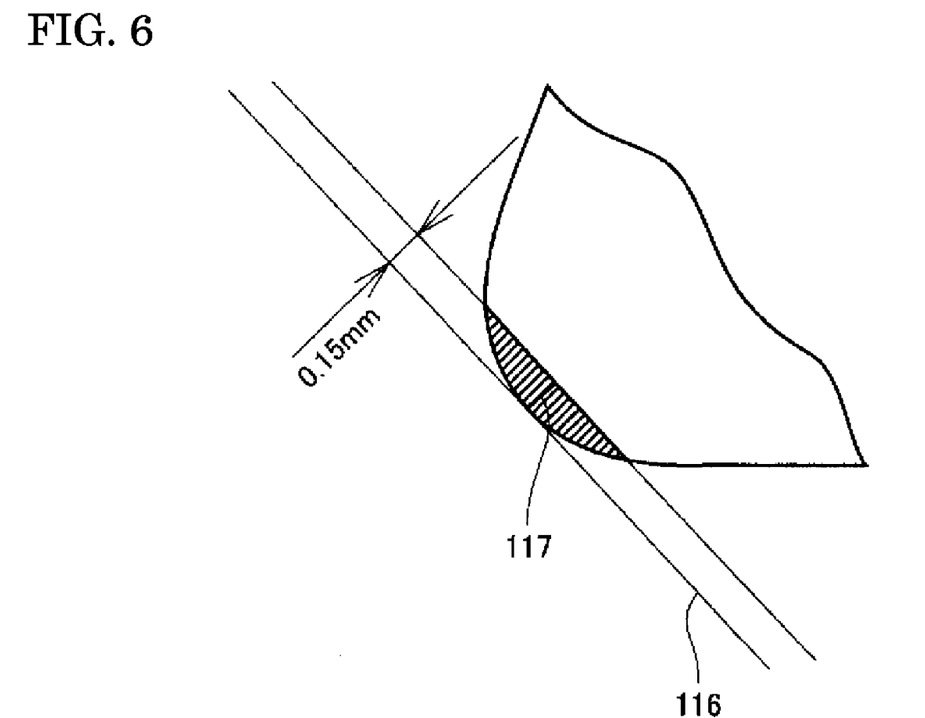
FIG. 6 is an enlarged schematic plan view showing a thickness measurement position and a position used as a cutting edge of each of layers constituting a coating layer in Examples 7 to 9 and Comparative Example 3.

The thickness of each of the layers and the total thickness of the coating layer shown in Table V is an average value calculated from the measured values measured as follows: As shown in an enlarged schematic plan view of FIG. 6, in a region (a shadowed region in FIG. 6) of 0.15 mm in an inward direction perpendicular to a hypothetical tangent 116 to the circular-arc end portion of each of the cutting edges 1 to 4 of each surface-coated cutting tool of Example 7, a section taken along a hypothetical line 117 drawn perpendicularly to the hypothetical tangent 116 from the contact between the circular-arc curved end portion and the hypothetical tangent 116 of each of the cutting edges 1 to 4 was lapped at ten positions on the hypothetical line 117. The thickness of each layer and the total thickness of the coating layer were measured with a metallographic microscope at a total of 10 positions in each surface-coated cutting tool, and the measured values were averaged.

In Table V, the thickness of each of the layers constituting the coating layer, the total thickness of the coating layer, and each of A value, B value, C value, and D value are described according to the notations in Table I.

Further, a continuous cutting test and an intermittent cutting test were performed by bringing each of the cutting edges 1 to 4 (shadowed portion in FIG. 6) of each surface-coated cutting tool of Example 7 into contact with a workpiece under the conditions below. The results are shown in Table VI.

<Continuous Cutting Test Conditions>

Holder used: PCLNR2525-43 (manufactured by Sumitomo Electric Hardmetal Corp.)
Workpiece: FCD450 (HB=230), round rod of 250 mm in diameter
Cutting speed: 180 m/min
Feed: 0.35 mm/rev.
Depth of cut: 1.5 mm
Cutting time: 20 minutes
Cutting oil: water-soluble oil
Amount of wear: An average value of flank wear amount VB of each of the cutting edges on the upper surface side and the cutting edges on the lower surface side was calculated from values measured in a test of ten cutting edges on each of the upper and lower surface sides.

<Intermittent Cutting Test Conditions>

Holder used: PCLNR2525-43 (manufactured by Sumitomo Electric Hardmetal Corp.)
Workpiece: FCD700 (HB=240), round rod of 250 mm in diameter having four grooves
Cutting speed: 100 m/min
Feed: 0.45 mm/rev.
Depth of cut: 2 mm
Cutting time: 30 seconds
Cutting oil: No
Defective rate: A test was carried out using 20 cutting edges on each of the upper and lower surface sides to calculate a rate of defects (defective rate: %) of the cutting edges on each of the upper and the lower surface side.

Table VI indicates that each of the surface-coated cutting tools of Example 7 shows large differences in the amount of flank wear VB (mm) and the defective rate (%) between the cutting edges on the upper and lower surface sides. Therefore, the preferred cutting conditions for cutting with the cutting edge on the upper surface side are greatly different from those for cutting with the cutting edge on the lower surface side. It was thus confirmed that the same surface-coated cutting tool can preferably comply with various cutting conditions.

Example 8

A plurality of surface-coated cutting tools of Example 8 was formed by the same method as in Example 7 except that a coating layer was formed under conditions different from those in Example 7.

In each of the surface-coated cutting tools of Example 8, the thickness of each of the layers constituting the coating layer and the total thickness of the coating layer were measured by the same method as in Example 7. The results are shown in Table V.

A continuous cutting test and an intermittent cutting test were carried out by bringing each of the cutting edges 1 to 4 (shadowed portion in FIG. 6) of each surface-coated cutting tool of Example 8 into contact with a workpiece under the same conditions as in Example 7. The results are shown in Table VI.

Table VI indicates that each of the surface-coated cutting tools of Example 8 shows large differences in the amount of flank wear VB (mm) and the defective rate (%) between the cutting edges on the upper and lower surface sides. Therefore, the preferred cutting conditions for cutting with the cutting edge on the upper surface side are greatly different from those for cutting with the cutting edge on the lower surface side. It was thus confirmed that the same surface-coated cutting tool can preferably comply with various cutting conditions.

Example 9

A plurality of surface-coated cutting tools of Example 9 was formed by the same method as in Example 7 except that a coating layer was formed under conditions different from those in Example 7.

In each of the surface-coated cutting tools of Example 9, the thickness of each of the layers constituting the coating layer and the total thickness of the coating layer were measured by the same method as in Example 7. The results are shown in Table V.

A continuous cutting test and an intermittent cutting test were carried out by bringing each of the cutting edges 1 to 4 (shadowed portion in FIG. 6) of each surface-coated cutting tool of Example 9 into contact with a workpiece under the same conditions as in Example 7. The results are shown in Table VI.

Table VI indicates that each of the surface-coated cutting tools of Example 9 shows large differences in the amount of flank wear VB (mm) and the defective rate (%) between the cutting edges on the upper and lower surface sides. Therefore, the preferred cutting conditions for cutting with the cutting edge on the upper surface side are greatly different from those for cutting with the cutting edge on the lower surface side. It was thus confirmed that the same surface-coated cutting tool can preferably comply with various cutting conditions.

Comparative Example 3

A plurality of surface-coated cutting tools of Comparative Example 3 was formed by the same method as in Example 3 except that a coating layer was formed under conditions different from those in Example 7.

In each of the surface-coated cutting tools of Comparative Example 3, the thickness of each of the layers constituting the coating layer and the total thickness of the coating layer were measured by the same method as in Example 7. The results are shown in Table V.

A continuous cutting test and an intermittent cutting test were carried out by bringing each of the cutting edges 1 to 4 (shadowed portion in FIG. 6) of each surface-coated cutting tool of Comparative Example 3 into contact with a workpiece under the same conditions as in Example 7. The results are shown in Table VI.

Table II indicates that each of the surface-coated cutting tools of Comparative Example 1 shows the same value of each of the amount of flank wear VB (mm) and the defective rate (%) for the cutting edges on the upper and lower surface sides. It was thus confirmed that the surface-coated cutting tool of Comparative Example 1 can comply with only the same cutting conditions even by using any one of the cutting edges.

TABLE V

Thickness of each layer constituting coating layer (μm)

|  |  | TiN layer | MT-TiCN layer | TiBN layer | α-Al$_2$O$_3$ layer | TiN layer | Total | A value | B value | C value | D value |
|---|---|---|---|---|---|---|---|---|---|---|---|
| Example 7 | Upper cutting edge 1 | 0.33 | 10.45 | 0.25 | 5.14 | 0.35 | 16.52 | 0.044 | 0.041 | 0.052 | 0.049 |
|  | Upper cutting edge 2 | 0.32 | 10.44 | 0.24 | 5.13 | 0.34 | 16.47 |  |  |  |  |
|  | Lower cutting edge 3 | 0.33 | 9.94 | 0.24 | 4.97 | 0.34 | 15.82 |  |  |  |  |
|  | Lower cutting edge 4 | 0.34 | 9.92 | 0.25 | 4.96 | 0.34 | 15.81 |  |  |  |  |
| Example 8 | Upper cutting edge 1 | 0.33 | 10.43 | 0.25 | 5.13 | 0.35 | 16.49 | 0.105 | 0.097 | 0.116 | 0.108 |
|  | Upper cutting edge 2 | 0.33 | 10.45 | 0.25 | 5.13 | 0.34 | 16.50 |  |  |  |  |
|  | Lower cutting edge 3 | 0.31 | 9.32 | 0.23 | 4.72 | 0.34 | 14.92 |  |  |  |  |
|  | Lower cutting edge 4 | 0.30 | 9.30 | 0.23 | 4.70 | 0.33 | 14.86 |  |  |  |  |
| Example 9 | Upper cutting edge 1 | 0.33 | 10.45 | 0.24 | 5.15 | 0.34 | 16.51 | 0.229 | 0.204 | 0.297 | 0.258 |
|  | Upper cutting edge 2 | 0.33 | 10.44 | 0.24 | 5.14 | 0.34 | 16.49 |  |  |  |  |
|  | Lower cutting edge 3 | 0.30 | 7.76 | 0.23 | 4.55 | 0.31 | 13.15 |  |  |  |  |
|  | Lower cutting edge 4 | 0.29 | 7.75 | 0.22 | 4.55 | 0.31 | 13.12 |  |  |  |  |
| Comparative Example 3 | Upper cutting edge 1 | 0.33 | 10.44 | 0.25 | 5.14 | 0.34 | 16.50 | 0.002 | 0.002 | 0.002 | 0.001 |
|  | Upper cutting edge 2 | 0.32 | 10.45 | 0.26 | 5.13 | 0.33 | 16.49 |  |  |  |  |
|  | Lower cutting edge 3 | 0.33 | 10.44 | 0.24 | 5.12 | 0.33 | 16.46 |  |  |  |  |
|  | Lower cutting edge 4 | 0.33 | 10.43 | 0.25 | 5.12 | 0.33 | 16.46 |  |  |  |  |

TABLE VI

|  |  | Amount of flank wear VB (mm) | Defective rate (%) |
|---|---|---|---|
| Example 7 | Upper surface | 0.102 | 85 |
|  | Lower surface | 0.103 | 50 |
| Example 8 | Upper surface | 0.102 | 85 |
|  | Lower surface | 0.104 | 40 |
| Example 9 | Upper surface | 0.102 | 85 |
|  | Lower surface | 0.105 | 25 |
| Comparative Example 3 | Upper surface | 0.102 | 85 |
|  | Lower surface | 0.102 | 85 |

Each of the surface-coated cutting tools of Examples 1 to 6 is provided with a chip breaker, while each of the surface-coated cutting tools of Examples 7 to 9 is not provided with a chip breaker. However, it is thought that the same effect can be obtained regardless of the presence of the chip breaker.

It is also thought that even when the surface of the coating layer of each of the surface-coated cutting tools of Examples 1 to 9 is processed by blasting, barreling, or brushing, the effect of the present invention is maintained.

It is further thought that although the coating layer of each of the surface-coated cutting tools of Example 4 to 6 includes a signal layer, the same effect as in Examples 4 to 6 can be obtained even when the coating layer includes a plurality of layers.

In each of the above-described TiN layer, MT-TiCN layer, TiBN layer, and TiAlN layer, the element composition need not necessarily be a stoichiometric composition.

It should be thought that all the disclosed embodiments and examples are illustrative but are not limitative in all aspects. It is intended that the scope of the present invention is described in the claims not in the above description and includes meaning equivalent to those in the claims and any change within the scope of the present invention.

INDUSTRIAL APPLICABILITY

According to the present invention, a surface-coated cutting tool capable of complying with different cutting conditions by a single type can be provided.

The invention claimed is:

1. A surface-coated cutting tool comprising a coating layer formed on a throw-away tip, wherein assuming that the average thickness of the coating layer on a first surface and a second surface of the throw-away tip is A, a difference between the maximum thickness and the minimum thickness of the coating layer between the first surface and the second surface is larger than 0.04×A, wherein the first surface is opposite to the second surface, and wherein the first surface and the second surface are rake faces.

2. The surface-coated cutting tool according to claim 1, wherein the thickness of the coating layer is the thickness at a cutting edge portion of the coating layer.

3. The surface-coated cutting tool according to claim 1, wherein the throw-away tip is composed of at least one selected from the group consisting of a WC-based cemented carbide, cermet, high-speed steel, ceramic, a cubic boron nitride sintered compact, a diamond sintered compact, a silicon nitride sintered compact, aluminum oxide, and titanium carbide.

4. The surface-coated cutting tool according to claim 1, wherein the coating layer comprises a plurality of compound layers, and wherein the average thickness of the coating layer is defined as an average of total combined thicknesses of all of the plurality of compound layers.

5. A surface-coated cutting tool comprising a coating layer formed on a throw-away tip, wherein assuming that the average thickness of the coating layer on a first surface of the throw-away tip is B1, and the average thickness of the coating layer on a second surface of the throw-away tip is B2, a value obtained by dividing an absolute difference value between B1 and B2 by a larger value of B1 and B2 is larger than 0.04, wherein the first surface is opposite to the second surface, and wherein the first surface and the second surface are rake faces.

6. The surface-coated cutting tool according to claim 5, wherein the thickness of the coating layer is the thickness at a cutting edge portion of the coating layer.

7. the surface-coated cutting tool according to claim 5, wherein the throw-away tip is composed of at least one selected from the group consisting of a WC-based cemented carbide, cermet, high-speed steel, ceramic, a cubic boron nitride sintered compact, a diamond sintered compact, a silicon nitride sintered compact, aluminum oxide, and titanium carbide.

8. The surface-coated cutting tool according to claim 5, wherein the coating layer comprises a plurality of compound layers, wherein the average thickness of the coating layer on the first surface is defined as an average of total combined thicknesses of all of the plurality of compound layers on the first surface, and wherein the average thickness of the coating layer on the second surface is defined as an average of total combined thicknesses of all of the plurality of compound layers on the second surface.

9. A surface-coated cutting tool comprising a coating layer formed on a throw-away tip, the coating layer including a compound layer, wherein assuming that the average thickness of the compound layer on a first surface and a second surface of the throw-away tip is C, a difference between the maximum and minimum thicknesses of the compound layer between the first surface and the second surface is larger than 0.04×C, wherein the first surface is opposite to the second surface, and wherein the first surface and the second surface are rake faces.

10. The surface-coated cutting tool according to claim 9, wherein the thickness of the compound layer is the thickness at a cutting edge portion of the compound layer.

11. The surface-coated cutting tool according to claim 9, wherein the compound layer is composed or mainly composed of a compound of at least one element selected from the group consisting of titanium, zirconium, hafnium, vanadium, niobium, tantalum, chromium, molybdenum, tungsten, aluminum, and silicon, and at least one element selected from the group consisting of boron, carbon, nitrogen, and oxygen.

12. The surface-coated cutting tool according to claim 9, wherein the compound layer is composed of or mainly composed of a compound of at least one element selected from the group consisting of boron, carbon, nitrogen, and oxygen, and titanium.

13. The surface-coated cutting tool according to claim 9, wherein the compound layer is composed of or mainly composed of a titanium carbonitride formed by a MT-CVD method.

14. The surface-coated cutting tool according to claim 9, wherein the throw-away tip is composed of at least one selected from the group consisting of a WC-based cemented carbide, cermet, high-speed steel, ceramic, a cubic boron nitride sintered compact, a diamond sintered compact, a silicon nitride sintered compact, aluminum oxide, and titanium carbide.

15. The surface-coated cutting tool according to claim 9, wherein the coating layer comprises a plurality of compound layers, and wherein the average thickness of the compound layer is defined as an average of total combined thicknesses of all of the plurality of compound layers.

16. A surface-coated cutting tool comprising a coating layer formed on a throw-away tip, the coating layer including a compound layer, wherein assuming that the average thickness of the compound layer on a first surface of the throw-away tip is D1, and the average thickness of the compound layer on a second surface of the throw-away tip is D2, a value obtained by dividing an absolute difference value between D1 and D2 by a larger value of D1 and D2 is larger than 0.04, wherein the first surface is opposite to the second surface, and wherein the first surface and the second surface are rake faces.

17. The surface-coated cutting tool according to claim 16, wherein the thickness of the compound layer is the thickness at a cutting edge portion of the compound layer.

18. The surface-coated cutting tool according to claim 16, wherein the compound layer is composed of or mainly composed of a compound of at least one element selected from the group consisting of titanium, zirconium, hafnium, vanadium, niobium, tantalum, chromium, molybdenum, tungsten, aluminum, and silicon, and at least one element selected from the group consisting of boron, carbon, nitrogen, and oxygen.

19. The surface-coated cutting tool according to claim 16, wherein the compound layer is composed of or mainly composed of a compound of at least one element selected from the group consisting of boron, carbon, nitrogen, and oxygen, and titanium.

20. The surface-coated cutting tool according to claim 16, wherein the compound layer is composed of or mainly composed of a titanium carbonitride formed by a MT-CVD method.

21. The surface-coated cutting tool according to claim 16, wherein the throw-away tip is composed of at least one selected from the group consisting of a WC-based cemented carbide, cermet, high-speed steel, ceramic, a cubic boron nitride sintered compact, a diamond sintered compact, a silicon nitride sintered compact, aluminum oxide, and titanium carbide.

22. The surface-coated cutting tool according to claim 16, wherein the coating layer comprises a plurality of compound layers, wherein the average thickness of the compound layer on the first surface is defined as an average of total combined thicknesses of all of the plurality of compound layers on the first surface, and wherein the average thickness of the compound layer on the second surface is defined as an average of total combined thicknesses of all of the plurality of compound layers on the second surface.

* * * * *